United States Patent [19]

Jonqueres et al.

[11] Patent Number: 4,786,294
[45] Date of Patent: Nov. 22, 1988

[54] INTEGRATED GAS PURIFICATION AND THERMAL CONDITIONING SYSTEM UTILIZING MOLECULAR SIEVE ADSORPTION

[75] Inventors: Michel A. Jonqueres, Torrance; Robert J. Kay, Redondo Beach, both of Calif.

[73] Assignee: Allied-Signal Inc., Morris Township, Morris County, N.J.

[21] Appl. No.: 135,872

[22] Filed: Dec. 21, 1987

[51] Int. Cl.4 .............................................. B01D 53/04
[52] U.S. Cl. ...................................... 55/28; 55/62; 55/68; 55/75; 55/161; 55/179; 55/208; 55/267; 55/389; 423/228; 423/230
[58] Field of Search ................ 55/18, 20, 21, 25–28, 55/58, 62, 68, 74, 75, 161–163, 179, 208, 267, 274, 387, 389; 423/227–230

[56] References Cited

U.S. PATENT DOCUMENTS

| | | | |
|---|---|---|---|
| 2,545,194 | 3/1951 | Colburn et al. | 55/68 |
| 2,818,323 | 12/1957 | Haensel | 423/230 X |
| 3,104,162 | 9/1963 | Skarstrom | 55/58 |
| 3,196,596 | 7/1965 | Miller | 55/68 X |
| 3,242,651 | 3/1966 | Arnoldi | 55/68 X |
| 3,355,860 | 12/1967 | Arnoldi | 55/68 X |
| 3,469,934 | 9/1969 | Bocard et al. | 423/229 X |
| 3,491,031 | 1/1970 | Stoneburner | 423/230 X |
| 3,497,312 | 2/1970 | Zeff et al. | 423/230 |
| 3,659,400 | 5/1972 | Kester | 423/230 X |
| 3,729,902 | 5/1973 | Ventriglio et al. | 55/389 |
| 3,891,411 | 6/1975 | Meyer | 55/58 X |
| 3,960,522 | 6/1976 | Munzner et al. | 55/68 |
| 4,005,708 | 2/1977 | Netteland et al. | 423/230 X |
| 4,012,206 | 3/1977 | Macriss et al. | 55/389 X |
| 4,030,896 | 6/1977 | Wimber et al. | 55/68 X |
| 4,046,709 | 9/1977 | Yuki | 55/68 X |
| 4,165,972 | 8/1979 | Iles et al. | 55/28 |
| 4,197,095 | 4/1980 | White, Jr. et al. | 55/389 |
| 4,222,750 | 9/1980 | Gauthier et al. | 55/68 X |
| 4,336,159 | 6/1982 | Winter | 55/27 X |
| 4,420,415 | 12/1983 | Yuki et al. | 55/68 X |
| 4,472,178 | 9/1984 | Kumar et al. | 55/28 X |
| 4,511,375 | 4/1985 | Bevier | 55/28 |
| 4,526,887 | 7/1985 | Sutt, Jr. | 55/68 X |
| 4,533,365 | 8/1985 | Ringel | 55/28 |
| 4,540,678 | 9/1985 | Sutt, Jr. | 55/68 X |
| 4,589,890 | 5/1986 | Gronvaldt | 55/208 X |
| 4,589,896 | 5/1986 | Chen et al. | 55/68 X |
| 4,661,124 | 4/1987 | Hamlin et al. | 55/68 X |
| 4,698,073 | 10/1987 | Rohde et al. | 55/208 X |
| 4,732,579 | 3/1988 | Veitman et al. | 55/27 X |
| 4,738,694 | 4/1988 | Godino et al. | 55/208 X |

FOREIGN PATENT DOCUMENTS

| | | | |
|---|---|---|---|
| 1619855 | 8/1970 | Fed. Rep. of Germany | 423/229 |
| 2531633 | 1/1977 | Fed. Rep. of Germany | 55/27 |
| 1360112 | 12/1964 | France | 423/230 |
| 227822 | 10/1986 | Japan | 423/228 |
| 86/0201 | 4/1986 | PCT Int'l Appl. | 55/25 |
| 762943 | 9/1980 | U.S.S.R. | 423/230 |

*Primary Examiner*—Robert Spitzer
*Attorney, Agent, or Firm*—James W. McFarland

[57] ABSTRACT

An integrated system for removal of $CO_2$ from and thermal conditioning of a gas mixture is disclosed. A pair of regenerating chemically impregnated molecular sieve absorption beds are used for removal of the $CO_2$. A heat exchanger used in the thermal conditioning subsystem also heats the gas used to regenerate the beds and cools absorption gas. A recirculation fan moves the gas mixture throughout the entire thermal conditioning and gas purification system.

24 Claims, 4 Drawing Sheets

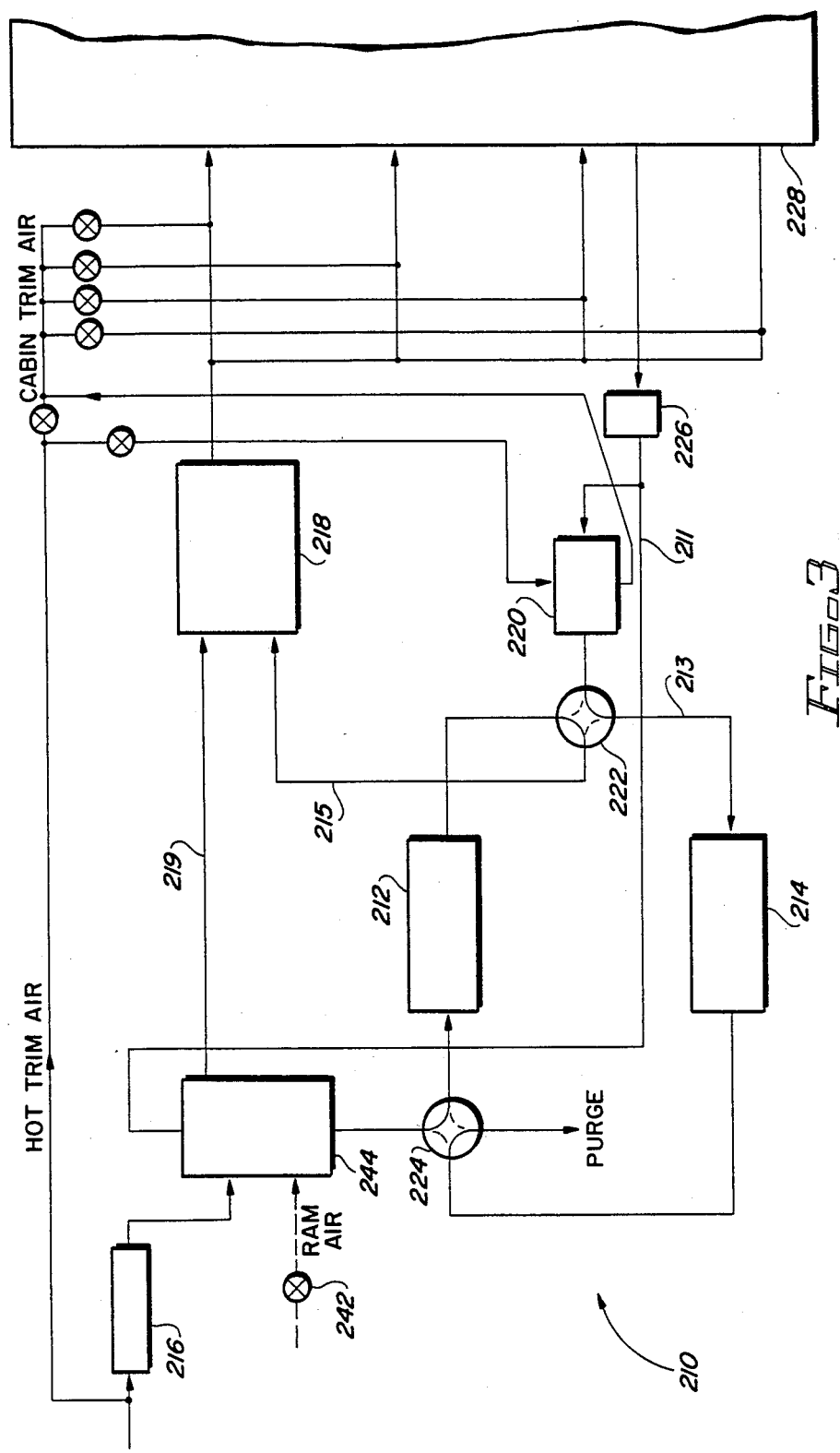

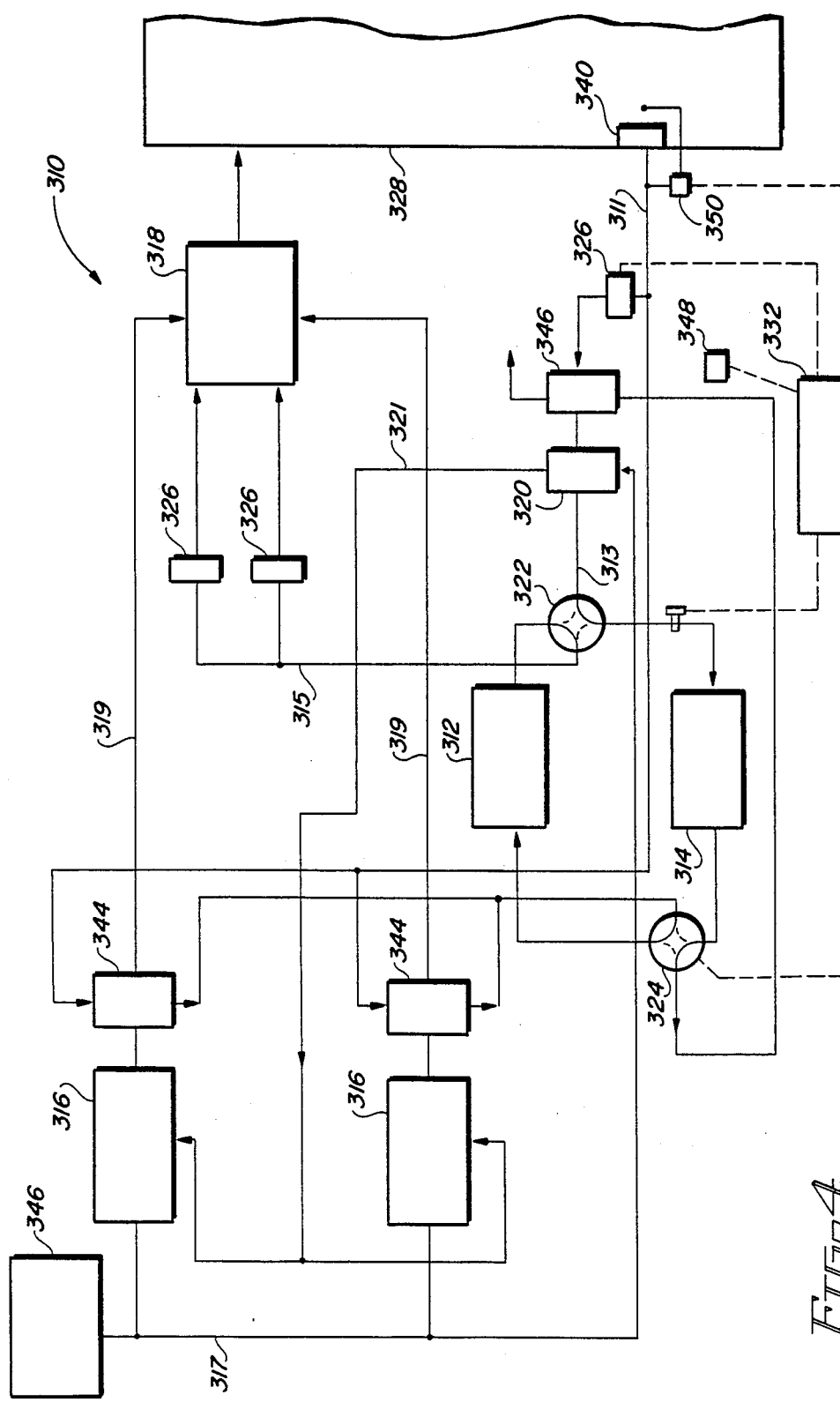

INTEGRATED GAS PURIFICATION AND THERMAL CONDITIONING SYSTEM UTILIZING MOLECULAR SIEVE ADSORPTION

BACKGROUND OF THE INVENTION

The invention primarily relates to the removal of impurities such as $CO_2$ from breathable atmospheres within a confined area. Various chemical and particulate filtration prior art systems are used for purification of gas mixtures. Such systems are particularly useful in confined areas such as aircraft cabins, spacecraft cabins, and submarines where sufficient fresh clean air is not available from the surrounding environment or otherwise impractical to obtain by other means.

U.S. Pat. No. 3,891,411 to Meyer discloses a purification system using zeolite molecular sieve beds. This invention discloses two beds which are configured in a parallel relationship and through which a gas is passed in order to remove the carbon dioxide therefrom. A system of valves controls the pressure of the gas passing through each of the beds. In order to adsorb carbon dioxide from the gas to be purified, the gas must be pressurized. Conversely, in order to remove this carbon dioxide from the desorbing bed and to thereby regenerate this bed, the gas passing therethrough must be at a relatively low pressure. Thus, this prior art system depends on a pressure swing between the desorbing and adsorbing beds. However, since additional energy must be expended in order to pressurize and depressurize the gas mixture passing through the beds, this prior art system is not energy efficient. Thus, the system may not be as desirable in applications where energy efficiency is required because of fuel constraints.

Still another prior art system incorporates a carbon molecular sieve for adsorption of $CO_2$. A representative example of such a prior art system is U.S. Pat. No. 3,729,902 to Ventriglio. This patent discloses an activated carbon sieve on which the chemical $K_2 CO_3$ is distributed. However, this zeolite molecular sieve system shows an affinity for $H_2O$ as well as $CO_2$. Liquid water adsorption by the zeolite beds will severely reduce their ability to adsorb $CO_2$ or other gases and therefore water must be removed prior to reaching the zeolite bed by addition of a dessicant device or the air heated to a level sufficient to reduce the water to vapor. Thus, in some applications where a dessicant is used, the water must be added back into the system by means of a humidifier. Addition of the dessicant, humidifier and water ducting is a severe penalty for airborne systems where a lightweight system is essential. Moreover, this prior art system also uses heated air to promote the adsorption of $CO_2$. This heated adsorption air is at a relatively high temperature and the desorption air is required to be at a still higher temperature in order to regenerate the zeolite sieve bed. Consequently, a disadvantage with such prior art systems is that they have a high energy cost due to the requirement of heating the air to the extreme temperatures required, and also have the added complexity, weight and energy cost involved in adding water back into the air which has been purified.

Other prior art systems recuperate the heat utilized in desorption of the bed. An example of such a prior art system is in U.S. Pat. No. 4,472,178 to Kumar. This prior art system is specifically designed for use in cryogenic adsorption systems. Such systems particularly remove water as well as carbon dioxide from the air stream. This system discloses a heat recuperator, specifically an accumulator is used as a heat recuperator to remove the heat from the air after the air has been adsorbed and transmit it to the desorption air stream in order to conserve heat energy and thereby reduce energy requirements of the system. However, the use of an accumulator to conserve energy may not be practical in many applications, particularly those on which space and weight are limited.

An air purification system is thus needed which is hydrophobic and which is capable of adsorbing $CO_2$ at normally available supply air pressures. Moreover, an air purification system is also needed that can remove the $CO_2$ with low energy consumption and minimal weight and size penalty.

SUMMARY OF THE INVENTION

It is a principle object of the present invention to provide an integrated gas purification system and thermal conditioning system.

It is an object of the invention to provide an air purification system utilizing hydrophobic carbon molecular sieves.

It is another object of the invention to provide an air purification system which functions by a temperature swing operation.

It is also another object of the invention to provide an air purification system which can purify efficiently at low gas pressures.

It is still another object of the invention to provide an air purification system which has low energy consumption.

It is also another object of the invention to provide an air purification system which has minimal size and weight.

The system of the present invention is specifically designed for gas purification of breathable atmospheres in confined areas such as aircraft cabins.

The invention combines a gas purification system with a thermal conditioning system. A carbon molecular sieve is used to selectively remove $CO_2$ from the gas mixture.

The system incorporates a chemically treated carbon molecular sieve adsorption bed which is capable of operating at relatively low atmospheric pressures. This eliminates the requirement that pumps be used to pressurize the air going into the adsorbing bed. Integration of the air purification and thermal conditioning system allows dual use of one heat exchanger to heat the desorbing air, and cool the cabin air. The cool supply air from the thermal conditioning (cooling) packs which would otherwise directly cool the cabin additionally may precool the air in a second heat exchanger going into the adsorption bed, thereby enhancing the adsorption effectiveness. This heat transfer does not reduce the cooling capacity of the cabin thermal system as the cooled purified air is ultimately supplied to the cabin or enclosure to be airconditioned. Moreover, use of common recirculation fans in both the thermal conditioning and purification air flows can further economize energy consumption.

In aircraft applications, the same source of fresh air, i.e. aircraft engine bleed air, can be used for both the thermal conditioning system and for the air purification system. This simplifies the system and eliminates the need for additional ducting and air pressurizing means. Moreover, the recirculation fan (or fans) which moves the air from the aircraft cabin to the mix manifold can also be used to move the air through the adsorption beds. The air to be purified from the cabin is mixed with air at cooler temperature from the cooling packs, resulting in a mixed air temperature lower than cabin return air. Reducing the temperature of an adsorption air enhances removal of $CO_2$ therefrom. An additional heat exchanger using hot trim air normally used to air condition the various cabin zones is also used to put the heat energy extracted from the trim air into air which is to be delivered to the desorption bed. This additional heat exchanger may instead be part of the cooling packs thereby enabling the cooling packs to more completely be utilized to provide both the heated and cooled air to the beds. Raising the temperature of the desorption air enhances removal of $CO_2$ from the bed. Depending on the operating conditions, the loss of trim air heat energy may have no or minimal impact on the thermal conditioning system performance or fuel usage. Additionally, a purge heat recovery heat exchanger may be added to reduce the amount of trim air needed. The coordination of these common components of the thermal conditioning and air purification subsystems can be used to optimize the performance of each subsystem while minimizing the size and power output of each component in order to keep weight and energy consumption within desireable parameters. Although system integration may require that the size, weight, and energy consumption of some components of the air conditioning system be increased, the overall weight and energy consumption size will be significantly reduced when considered as units in the complete dual purpose integrated system. Thus, in modern aircraft in which fuel costs and total weight are considered very important, the system integration improves aircraft fuel efficiency and minimizes aircraft weight and size penalties associated with air purification and thermal conditioning capabilities.

A chemically treated carbon molecular sieve bed is used to adsorb $CO_2$. This chemically treated carbon is selective for $CO_2$ and is hydrophobic. In contrast, prior art systems using zeolite remove water as well as $CO_2$ from the gas mixture. Thus, since the instant invention does not adsorb water at all (much less preferentially adsorb water as in prior art zeolite beds), the adsorbent amount required in the instant invention is much less than that required for zeolite adsorbent beds or other beds which also adsorb water. Thus, the size and weight of the adsorbent beds of the present invention are significantly reduced over those in the prior art. Instead of sizing the pores of the carbon molecular sieve, appropriate chemicals are added to the carbon sieve in order to render the sieve selective for $CO_2$.

Adsorption of $CO_2$ using the system of the present invention can take place at normal room temperatures in the carbon molecular sieve bed. However, there is more efficient adsorption at colder air temperatures with no lower limit on the temperature of the adsorption air. However, lowering of the temperature of the air going into the adsorption bed by approximately 40% is desireable for efficient adsorption. This allows the adsorption bed to be smaller than otherwise would be possible and improves the size and weight penalty of the system in aircraft applications.

Adsorption occurs due to a chemical reaction between the $CO_2$ and the treated carbon. A low temperature prevents a bond between the $CO_2$ and the treated carbon from breaking down and thus separation of the $CO_2$ therefrom. Therefore, it is desireable that the air going into the adsorption bed be cold and that the air passing into the desorption bed be heated to a maximum temperature of 200° F. in order to break down the chemical bond between the $CO_2$ and the treated carbon and to allow the bed to be regenerated. Due to the large temperature variation between the air being fed into the adsorption bed and the air fed into the desorption bed, it is practical to take advantage of the temperature variation produced by the thermal conditioning system of an aircraft to provide ths temperature swing for the adsorption process. By taking advantage of the high efficiency of adsorption provided by the cold air and the high efficiency of desorption provided by the hot air, pressure variations in the adsorption and desorption process are not required. Thus, no pump or vacuum source is needed.

In operation, the cooling packs receive fresh air from the aircraft engine bleed air and cool it, supplying this cooled air to both the aircraft cabin and from there to the adsorption bed. There are preferably a pair of carbon molecular sieve beds, one is adsorbing $CO_2$ while the other of which is desorbing $CO_2$. A suitable four way valve directs air flow into the appropriate bed. An electronic controller may be provided in order to control operation of the valve which directs airflow to the appropriate bed for adsorption or desorption. In conjunction with this controller, appropriate $CO_2$ sensors may be provided in order to determine the cycle time of the air going to the beds. The air being fed into the desorption bed comes from the hot air heat exchanger which heats this air to the desired level and properly cause regeneration of the bed. A mix manifold receives fresh air which has been suitably cooled by the cooling packs and recirculated air which has been purified by the adsorption bed and directs the combined air to the cabin. A suitable recirculation fan moves the air throughout the entire system thereby eliminating the requirement of having a separate blower or fan for each system which would otherwise be required. Thus, although the integrated system has a dual function, it is nevertheless relatively simple and therefore more likely to be trouble free and more reliable than other prior art systems.

BRIEF DESCRIPTION OF THE DRAWINGS

FIG. 3 is another embodiment of the invention similar to that of FIG. 1 except that the heat exchanger also receives the hot aircraft cabin trim air.

FIG. 4 is still another embodiment of the invention similar to that of FIG. 1 except that the heat exchangers receiving air from the cooling packs are also used to cool the air directed to the adsorption bed.

DETAILED DESCRIPTION OF THE PREFERRED EMBODIMENT

Figure 1:
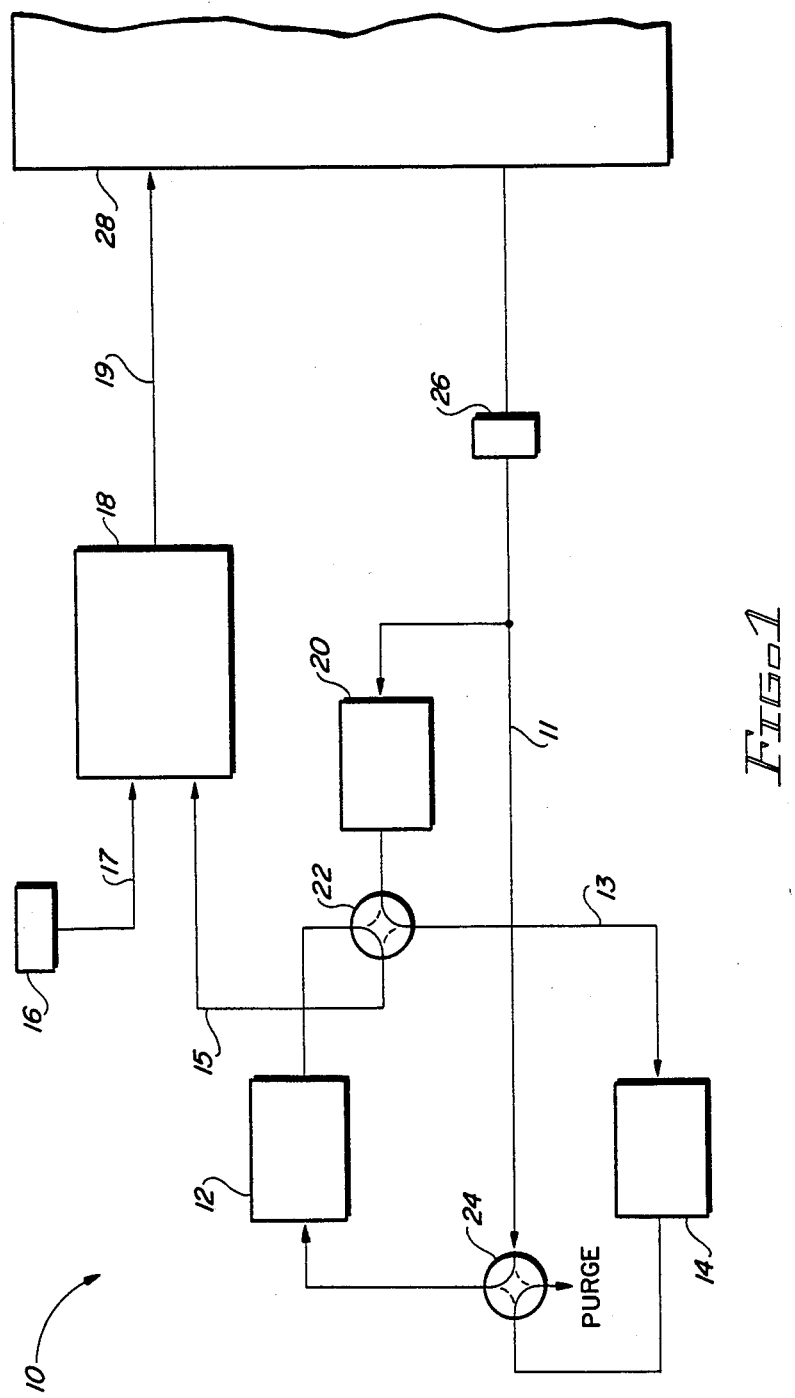
FIG. 1 is a schematic view of one embodiment of the invention having a pair of adsorption/desorption beds.

Referring now to FIG. 1, a first embodiment of the invention comprises an integrated thermal conditioning and purification system generally designated by the numeral 10. The invention includes preferably a pair of adsorption/desorption beds designated by the numerals 12 and 14 as shown. Although a single bed could be used, a plurality is preferred in order that there be continuous adsorption and desorption of an undesired impurity from a gas or gas mixture in a confined area. Thus, bed 12 is adsorbing $CO_2$ (or another impurity) from the incoming gas while bed 14 is preferably simultaneously desorbing $CO_2$ (or another impurity) from the gas mixture. Bed 12 preferably includes a carbon molecular sieve chemically treated to selectively adsorb $CO_2$ from the gas mixture. The carbon molecular sieve may, for example, be treated with an amine group of chemicals for selective adsorption of $CO_2$.

Cooling packs 16 receive fresh air, cool it to the desired temperature and direct it via conduit 17 through mix manifold 18 into an aircraft cabin or other confined area 28 via conduit 19. Air in the confined area 28 is drawn therefrom by recirculation fan 26 and directed via conduit 11 to bed 12 where $CO_2$ is adsorbed therefrom. Recirculation fan 26 also directs the air from the confined area 28 to the heat exchanger 20 which heats the air prior to it going to bed 14 via conduit 13 in order to regenerate bed 14. The temperature of the air going into bed 14 is preferably at a temperature no greater than 200° F. The air which has passed through bed 14 extracting the $CO_2$ impurities therefrom is purged from the system.

Air which has passed through bed 12 which has removed the $CO_2$ impurities therefrom to the desired degree is directed to mix manifold 18 via conduit 15 where it is mixed with fresh air from the cooling pack and directed to the cabin 28.

Since it is desired that sorbent bed 12 be adsorbing $CO_2$ while sorbent bed 14 is desorbing $CO_2$ and vice versa, two 4-way valves 22 and 24 are provided to direct the flow of air (air to be purified or air to regenerate the bed) into the appropriate bed 12 or 14 or from the appropriate bed 12 or 14 as desired for purge purposes. However, in order to simplify description, one bed (12) is designated as the adsorbing bed and the other bed (14) is designated as the desorbing bed.

Figure 2:
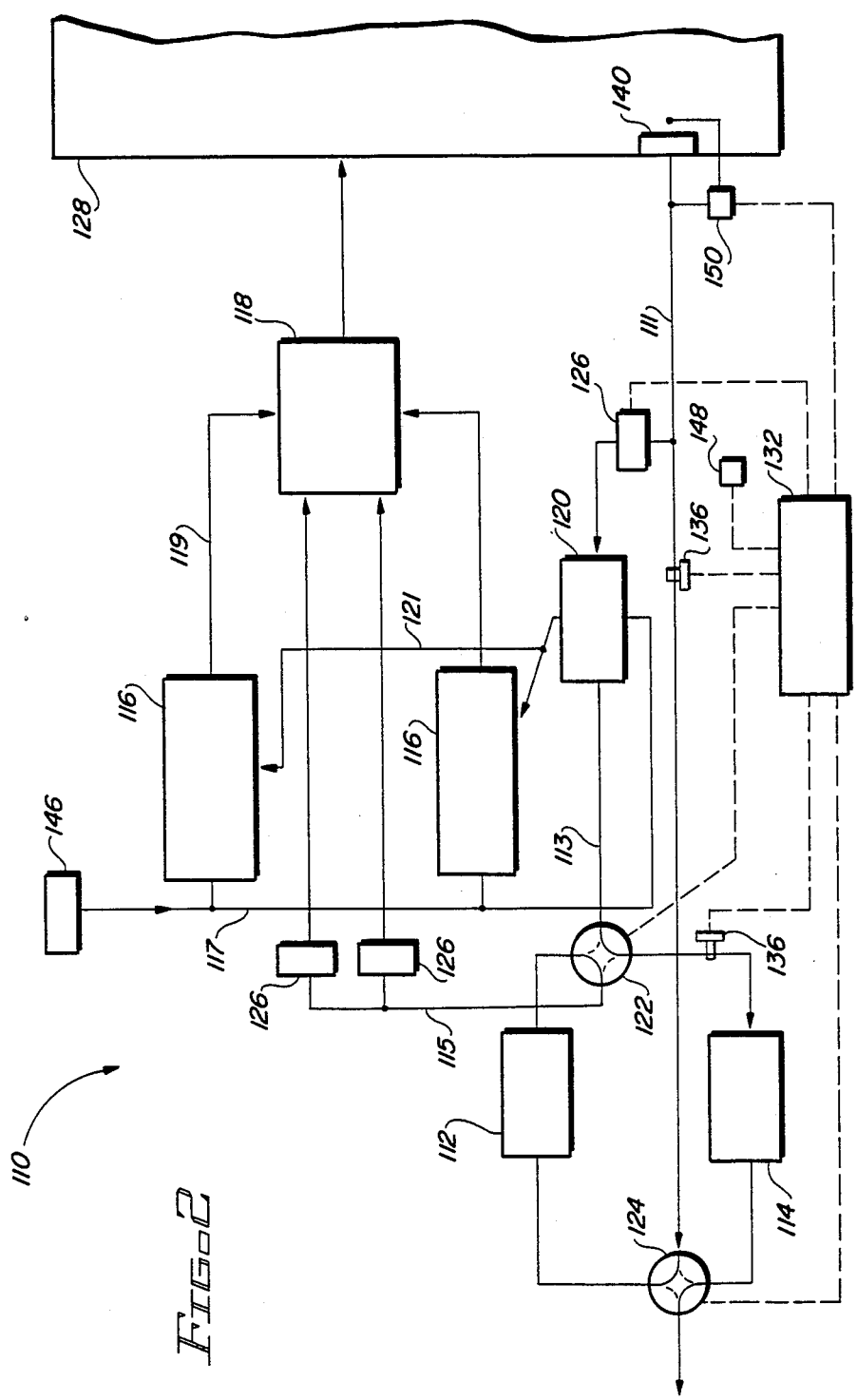
FIG. 2 is another embodiment of the invention similar to that of FIG. 1, but using cool air received from the confined area and further using an additional heat exchanger to heat the air going to the desorption bed and to cool the air going to the cooling packs.

FIG. 2 shows a second embodiment 110 of the invention which is similar to the embodiment of FIG. 1 except that it is specifically adapted for use in an aircraft and the heat exchanger 120 directly receives cabin air via conduit 111 and aircraft engine bleed air from bleed air source 146 via conduit 117. Heat exchanger 120 cools air going to the cooling packs 116 via conduit 121, and heats air going to desorbing bed 114 via conduit 113 to regenerate bed 114. Heat exchanger 120 may be integral with cooling packs 116 to utilize the heat extracted from the air going into mix manifold 118 to heat the air going to bed 114. In addition, a pair of recirculation fans 126 moves air directly from the adsorbing bed 112 to the mix manifold 118 and moves the air throughout the system. Conduit 115 communicatingly connects manifold 118 and bed 112. To improve efficient operation of the entire system 110, a controller 132 is provided to properly alternate adsorbing and desorbing airflow between the beds 112 and 114 in accordance with how much $CO_2$ the adsorbing bed 112 or 114 is removing from the air and/or how much $CO_2$ the desorbing bed 112 or 114 is putting back into the air. The controller 132 thus controls both valves 122 and 124 and has sensors 136 to sense the concentration of $CO_2$ in order to determine the proper cycling time for air moving through the beds 112 and 114. The sensors 136 are located to sense $CO_2$ concentration of the heated air going into the bed 114 and the air to be purified coming from the cabin 128 to monitor $CO_2$ concentration of cabin air (or sensor 136 can be located to directly sense $CO_2$ concentration of the air inside cabin 128). Suitably located temperature sensors may also be used to keep the air temperature within desired parameters. A computer 148 may also be connected to the controller 132 in order to further enhance efficiency and optimize system operation by processing data deemed important in determining proper cycling of airflow going to and from beds 112 and 114. In this embodiment 110, particulate filters 140 are provided within the cabin to filter particulate impurities out of the air before going to the bed 112 via conduit 111. A pressure transducer 150, analogous to transducer 350 of FIG. 4 described below, may also be included. The cooling packs 116 receive bleed air from source 146 via conduit 117, cool the air and direct it to mix manifold 118 via conduit 119. In all other ways sorbent beds and valves 122 and 124 and their operation in system 110 are essentially similar to those of embodiment 10.

FIG. 3 shows a third embodiment 210 of the invention specifically adapted for use in purifying and thermally conditioning the air in an aircraft cabin. Embodiment 210 is quite similar to embodiment 10 except that hot trim air to the cabin 228 is directed to the heat exchanger 220 and from there to the cabin 228 at a somewhat lower temperature. In this way, the heat exchanger 220 extracts heat energy from the hot trim air and uses that heat energy to heat the air going into the desorbing bed 214. Heat exchanger 220 receives cabin air via conduit 211. Heat exchanger 220 directs heated air into bed 214 via conduit 213 for desorption. Heat exchanger 244 receives both cabin air via conduit 211 and cooled air from cooling pack 216, further cools and directs it to bed 212 for adsorption. The air from bed 212 is directed via conduit 215 to mix manifold 218. Mix manifold 218 also receives cooled air from heat exchanger 244 and directs both this cooled air from exchanger 244 and purified air from bed 212 into cabin 228. In addition, FIG. 3 shows auxiliary ram air from ram air source 242 being received by heat exchanger 244. In all other ways, cooling pack 216, 4-way valves 222 and 224, and fan 226 and, their operation in embodiment 210 are essentially similar to those of embodiment 10.

FIG. 4 shows still another embodiment 310 of the invention wherein the cooling packs 316 are more efficiently utilized to provide both the cooling and the heating required for the adsorption-desorption process of the beds. Thus, the heat exchangers 344 used with the cooling packs 316 are used to cool, from conduit 311, the incoming air to be purified going into the adsorption bed 312. The bleed air coming from the aircraft engine bleed air source 346 is also directed into a heat exchanger 320 via conduit 317 which feeds hot air into the desorption bed 314 via conduit 313 for regeneration of the same. In addition, this additional heat exchanger 320 also provides cooler air going into the cooling pack 316 via conduit 321. Moreover, a heat exchanger 346 receives hot regenerating air from the desorbing bed 314, extracts heat energy from the regenerating air and purges it from the system 310. The extracted heat energy is used in heating the regenerating air going into desorbing bed 314 from heat exchanger 320. Mix manifold 318 has the same function as manifold 218 of mixing purified and recirculated air from conduit 315 with fresh air from conduit 319 to transmit the same into the cabin 328. Particulate filters 340 are used to draw cleaner air out of the cabin 328. Pressure transducer 350 is also provided at filter 340 for its operation. Controller 332 also is used to control the valves 322 and 324 to cycle the adsorption-desorption flow. Computer 348 is operably connected to controller 332 to process data for enhanced efficiency of the cycling. Cooling packs 316, heat exchaners 320 and 344 and recirculation fans 326 also are provided to perform essentially the same functions as pack 216, exchangers 220 and 244 and fans 226 in embodiment 210. In all other important respects this embodiment 310 is similar to embodiment 210.

Although the systems 10, 110, 210, and 310 have been specifically described with respect to the use of a chemically treated carbon molecular sieve bed, other suitable adsorption/desorption systems can also be used with the invention as described. For example, activated carbon or zeolite molecular sieve beds or any such other type of adsorption/desorption bed using temperature swing can be used. In addition, the beds can also be composed of a suitable composite material instead of just pure carbon.

The controller described hereinabove may simply be a timer which alternates flow of the adsorbing and desorbing flow to the appropriate beds based on a selected time interval which is deemed suitable for appropriate cycling of the desorption and adsorption air flows. The time interval is based on the desired $CO_2$ concentration of the purified air or other requirements of the particular use to which the system is put.

Since electrostatic attraction between the chemically treated carbon sieve and the $CO_2$ creates a relatively low energy physical bond therebetween, the adsorption process may take place at approximately room temperature. However, it is preferable that the adsorption take place at a somewhat lower temperature than this because the lower the temperature the stronger the bond between the $CO_2$ and the chemically treated carbon. Thus, the lower the temperature of the adsorbent airflow the better. However, the maximum temperature at which desorption takes place should not be greater than 200° F. and preferably is much lower. Thus, the difference between the required upper temperature limit and the required lower temperature limit is not great. This small temperature difference results in a relatively efficient low energy adsorption system.

Accordingly, there has been provided, in accordance with the invention an air purification and thermal conditioning system which fully satisfies the objectives set forth above. It is to be understood that all terms used herein are descriptive rather than limiting. Although the invention has been described in conjunction with the specific embodiments set forth above, many alternatives, modifications and variations will be apparent to those skilled in the art in light of the disclosures set forth herein. Accordingly, it is intended to include all such alternatives, embodiments, modifications and variations that fall within the scope of the invention as set forth in the claims hereinbelow.

I claim:

1. A method for purifying and thermally conditioning airflow to an aircraft cabin, comprising the steps of:
   bleeding a fresh airflow from an aircraft engine; cooling the fresh airflow to a desired temperature; delivering the cooled fresh airflow to the aircraft cabin;
   delivering a first portion of return airflow being returned from the aircraft cabin to a molecular sieve adsorption bed for removal of $CO_2$ therefrom, to produce a purified airflow;
   mixing the purified airflow with the fresh airflow being delivered to the aircraft cabin;
   heating a second portion of airflow being returned from the aircraft cabin;
   delivering the heated second portion of return airflow to the molecular sieve bed for desorption of $CO_2$ from said bed to regenerate the latter; and
   selectively alternating flow of the first portion and second portions of return airflow to said molecular sieve bed to cycle adsorption and desorption of $CO_2$ in said bed.

2. A gas purification and thermal conditioning system for removal of an impurity from and temperature control of a gas mixture in a confined area, comprising:
   an adsorption/desorption bed;
   a cooling pack, said cooling pack cooling the gas mixture for maintaining the mixture generally at a desired temperature within the confined area, said pack heating the gas mixture for enhanced desorption of the impurity from said bed;
   means for transmitting the gas mixture to said bed for adsorption and desorption;
   means for transmitting the gas mixture to said cooling pack for heating and cooling of the gas mixture;
   means for selectively alternating flow of heated gas mixture from said pack and cooled gas mixture from said pack into said bed in order to cycle adsorption and desorption of the impurity as desired.

3. The system of claim 2 wherein said bed contains a carbon molecular sieve.

4. The system of claim 3 wherein said carbon is chemically treated for selective adsorption of the impurity.

5. The system of claim 4 wherein the impurity is $CO_2$.

6. The system of claim 2 wherein said bed is a plurality of beds.

7. The system of claim 6 wherein said means for selectively alternating flow directs flow into one of said plurality of beds for adsorption therein and generally simultaneously directs flow into another of said plurality of beds for desorption therein so that the system is generally continuously adsorbing and desorbing the impurity from the gas mixture.

8. The system of claim 7 wherein said means for selectively alternating includes a valve connected to said bed and to said cooling pack for directing heated gas mixture and cooled gas mixture to said bed for selective adsorption and desorption of the impurity.

9. The system of claim 8 further including an electronic controller operatively connected to said valve, said controller selectively opening and closing said valve to alternate gas flow when a desired portion has elapsed deemed sufficient that the impurity concentration of the gas mixture going into said bed for adsorption therein has reached a predetermined level.

10. The system of claim 9 further including a sensor connected to said controller, said sensor monitoring the impurity concentration in the confined area to cutoff the adsorption/desorption cycle when the impurity concentration has fallen to a predetermined level.

11. The system of claim 2 further including a means for mixing purified gas mixture from said bed with cooled gas mixture from said pack, said means for mixing directing the mixed mixtures into the confined area.

12. The system of claim 11 wherein said means for mixing includes a mix manifold.

13. The system of claim 2 wherein said means for transmitting the gas mixture to said bed, said means for transmitting the gas mixture to said cooling pack and said means for transmitting the gas mixture to the confined area includes a fan.

14. An air purification and thermal conditioning system for removal of $CO_2$ from and temperature control of air in an aircraft cabin, comprising:
   a molecular sieve adsorption bed for adsorbing and desorbing $CO_2$ from the air;
   an aircraft engine bleed air source;
   a cooling pack receiving aircraft engine bleed air, said cooling pack cooling the bleed air in order to supply the cabin with fresh air at a desired temperature, and to supply said bed with air at a cool temperature for efficient adsorption;
   a first heat exchanger operatively connected to said cooling pack to extract heat energy from the bleed air for supplying said bed with heated air for efficient desorption;
   means for selectively alternating flow of cool air from said pack and heated air from said heat exchanger into said bed in order to cycle the adsorption and desorption of $CO_2$ in the bed;
   means for recirculating air through the system.

15. The system of claim 14 further including a second heat exchanger recovering heat from air purged from said bed after desorption, said second heat exchanger further heating of the heated air going into the bed for desorption to enhance regeneration of said bed.

16. The system of claim 14 wherein said bed contains carbon.

17. The system of claim 16 wherein said carbon is chemically impregnated for selective adsorption of $CO_2$.

18. The system of claim 14 wherein said means for recirculating includes a fan.

19. The system of claim 14 further including a mix manifold for mixing air purified by said bed with air from the cooling pack, said mix manifold directing the purified air and air from the cooling pack both into the cabin.

20. The system of claim 14 wherein said bed is a plurality of beds, one of which is receiving cool air for adsorption, while another of said plurality of beds is receiving heated air for desorption.

21. The system of claim 14 wherein said means for alternating includes a four-way valve.

22. The system of claim 14 further including a controller operatively connected to said means for alternating flow in order to selectively control the flow of cool air and heated air into said bed to cycle the flow in response to $CO_2$ concentration in the air.

23. The system of claim 22 further including a sensor monitoring the $CO_2$ concentration in the air in the cabin, said sensor connected to said controller so that said controller is responsive to the $CO_2$ concentration in the air in the cabin to alter cycling of the flow of air for adsorption and desorption in order to adjust cabin $CO_2$ concentration as desired.

24. The system of claim 14 further including a third heat exchanger cooling air received from said cooling pack and from the cabin and directing the cooled air into said bed for enhanced $CO_2$ adsorption.

* * * * *